May 13, 1958

J. H. WILLIAMS
SHEET-FEEDING MECHANISM FOR
PHOTO-COMPOSING MACHINES

Filed Oct. 6, 1953

INVENTOR
Joseph Henry Williams
BY
ATTORNEYS.

United States Patent Office 2,834,268
Patented May 13, 1958

2,834,268
SHEET-FEEDING MECHANISM FOR PHOTO-COMPOSING MACHINES

Joseph Henry Williams, Carshalton, England, assignor to The Monotype Corporation Limited, London, England, a British corporation Application October 6, 1953, Serial No. 384,460

Claims priority, application Great Britain September 24, 1953

4 Claims. (Cl. 95—4.5)

This invention relates to mechanism for feeding a light-sensitive sheet on to which images can be photographically projected in a photo-composing machine to produce "letterpress" text-matter or other typographic images or a pattern. More particularly, the invention relates to the class of photo-composing machines, wherein, during the composition of a line of matter, the sensitized receiving sheet is held stationary and is only advanced after the completion of a line of composition, to present a blank portion of the sheet for the composition of a fresh line of matter.

One object of the invention is to provide mechanism to control the accurate positioning and movement of a support for the sensitized sheet, during its passage through the composing machine relatively to the optical system and ensure precise alignment and register of the images projected and accurate ruling between lines of composition.

Another object of the invention is to provide mechanism whereby the support for the sensitized sheet can be re-adjusted or reset to enable additional images or matter to be photographed on the sheet, the masters for which could not be included conveniently, during the first composition and to ensure that such additional images or matter will be photographed in accurate alignment and register with the matter photographed during the first composition.

According to the present invention, the mechanism comprises a cylindrical support for a sheet of light-sensitized material rotatably mounted within a light-excluding casing and furnished with sheet-registering devices, an adjustable measuring device for determining the extent of each rotary movement of the support, a driving gear for the cylindrical support co-operating with the measuring mechanism, and a movable retaining catch to hold the cylindrical support stationary during the composition of a line of matter.

The invention will now be particularly described for use with a photo-composing machine for the production from suitable masters or originals of "letter-press" or text-matter in column or page form as suitable for book, magazine, newspaper and similar work.

Although particularly applicable to photo-composing machines for the composition of "letter-press" or text-matter, the invention is also applicable to machines for the photo-composition of, for example, headlines, titles, decorations, fancy borders, rules or other typographic images.

The invention is also applicable to machines known to the printing industry as "step-and-repeat" machines.

Referring to the accompanying drawings.

The cylindrical sheet-support $A$ is fixed to a shaft $A^1$ which is rotatably supported in bearings $B^2$, $B^3$ is an enclosing casing, conveniently constructed in two parts $B$, $B^1$.

Figure 3:
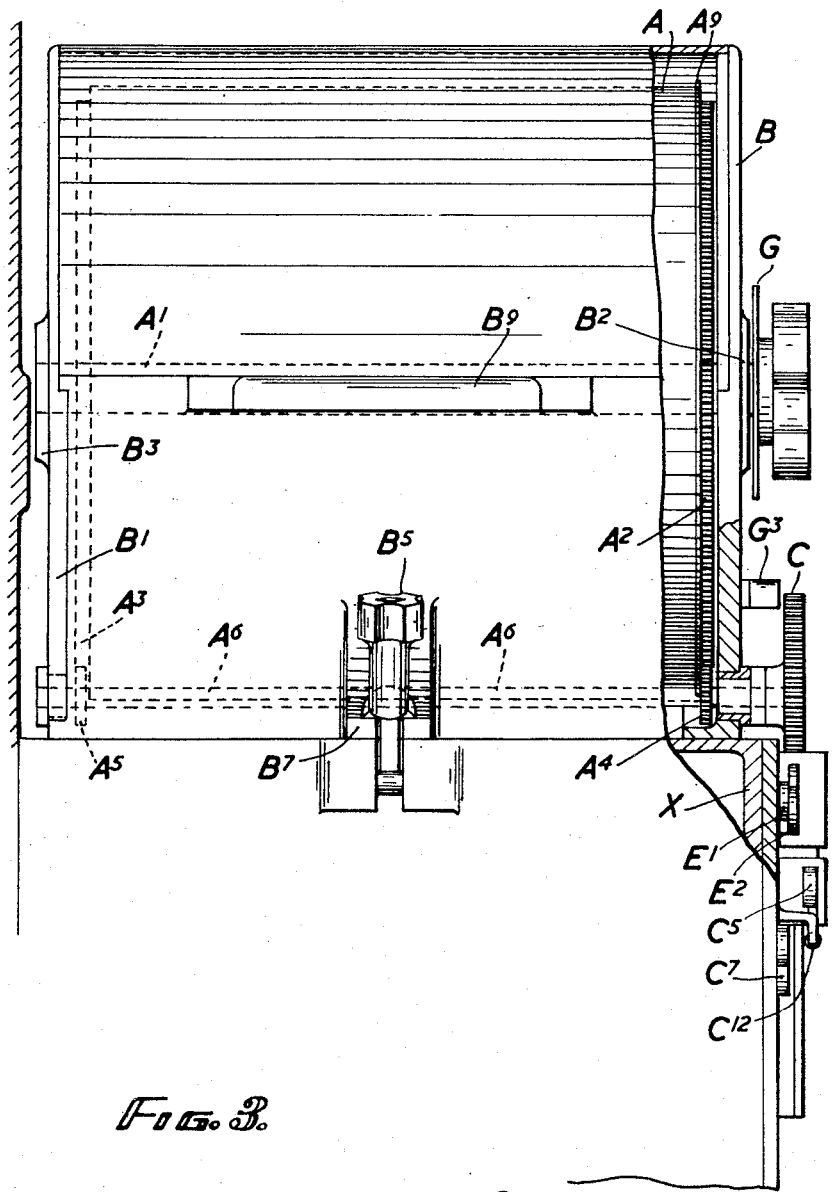
Fig. 3 is an end elevation, partly in section, of the mechanism shown in Figs. 1 and 2, together with the casing in which the sheet-support is mounted.

At each end, the support $A$ is fitted with a toothed ring $A^2$, $A^3$, respectively, and the teeth of these rings gear with toothed pinions $A^4$, $A^5$ respectively, (see Figs. 3 and 4) carried on a shaft $A^6$, which is rotatably mounted at its opposite ends in bearings in the end walls of the lower half $B^1$ of the casing.

Figure 2:
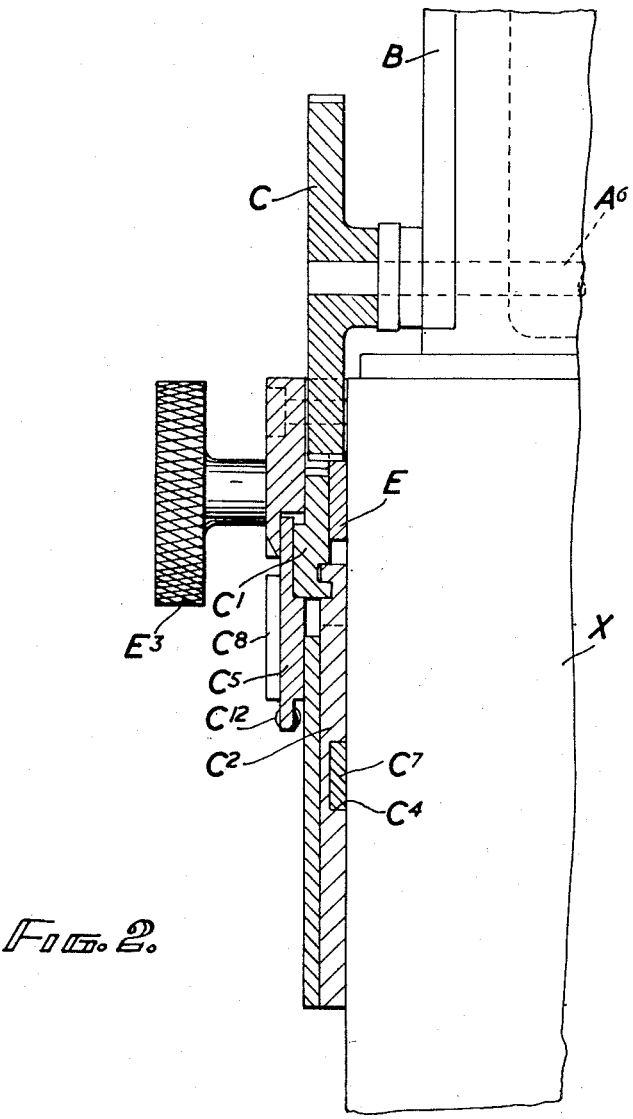
Fig. 2 is a sectional side elevation on an enlarged scale on the line 2—2 of Fig. 1.

At the outer end of the shaft $A^6$ is attached a toothed wheel $C$ with which a rack $C^1$ can be brought into gear. This rack $C^1$ (see Fig. 2) constitutes a member of the measuring device which determines the exact extent of each rotary movement of the sheet-support $A$, and is mounted to slide longitudinally on the horizontal part of a T-shaped bar $C^2$. The vertical part of the bar $C^2$ is mounted to slide in a housing $C^3$.

The rack $C^1$ is connected to a measuring bar $C^5$ which is mounted to slide longitudinally in brackets $C^9$, $C^9$, secured to the machine frame.

Figure 1:
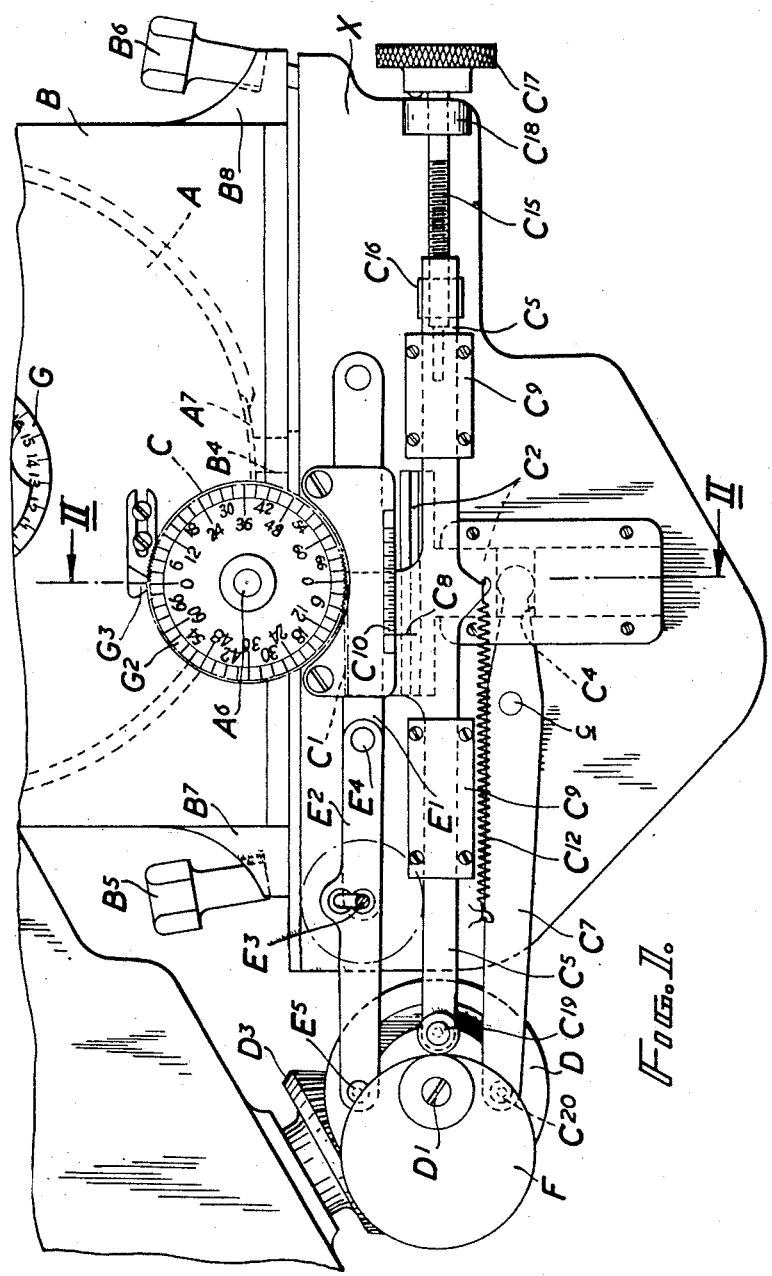
Fig. 1 is a front elevation of the mechanism according to the present invention.
Figure 5:
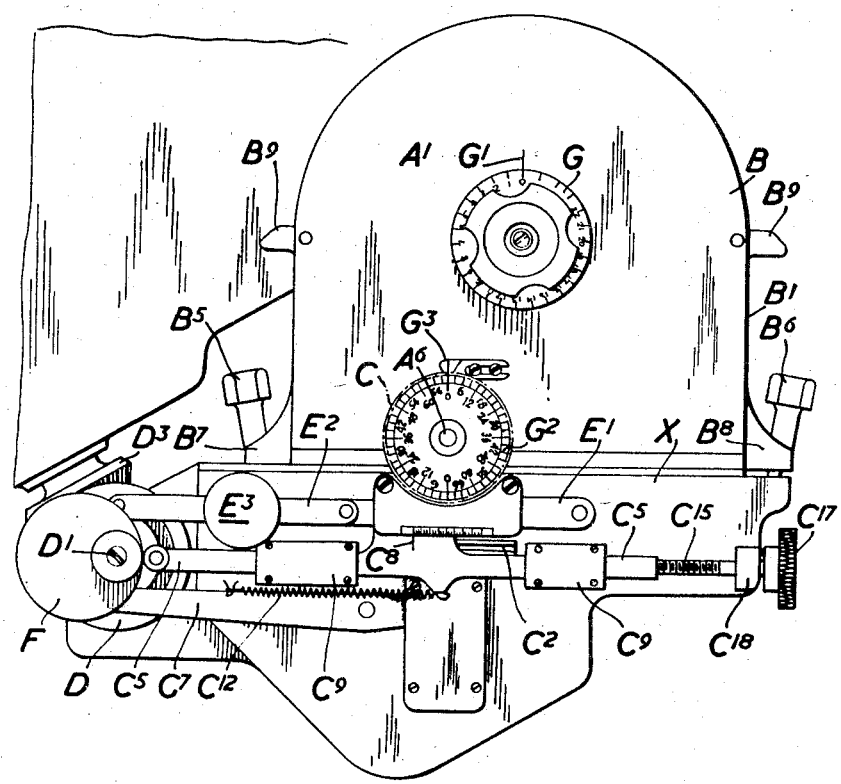
Fig. 5 is a front elevation of the complete unit.

The extent of each rotary movement of the sheet-support $A$ is determined by the setting of the measuring bar $C^5$ and the rack $C^1$ coupled thereto relatively to a driving cam $F$ and to enable this setting to be made within extremely exact limits, a pointer $C^8$ is provided on the bar $C^5$ to register with a scale $C^{10}$ on the machine frame (see Figs. 1 and 5).

The bar $C^5$ and rack $C^1$ are moved longitudinally by the cam $F$ carried on the same driving shaft as a cam $D$.

Initially the bar $C^5$, the rear end of which is furnished with an eccentrically mounted roller $C^{19}$ is held against the cam $F$ by a spring $C^{12}$, and the pointer $C^8$ carried thereby will be aligned with that end of the scale $C^{10}$ indicating the largest point size of images with which the machine is arranged to produce (see Figs. 1 and 5). In the present example the scale $C^{10}$ is marked for images of from, say 4 up to 24 typographical points.

The bar is adjusted, relatively to the cam $F$ and the scale $C^{10}$, by a threaded spindle $C^{15}$ which screws into a nut $C^{16}$ on the end of the bar $C^5$. This spindle is rotated to adjust the bar $C^5$ relatively to the cam $F$ and the scale $C^{10}$ by a knob $C^{17}$ which passes through and bears against a stop $C^{18}$ on the machine frame. The end of the bar $C^5$ is turned down over the nut, so that as the spindle $C^{15}$ is rotated, the bar $C^5$ is drawn to the right hand, as shown in Fig. 1.

The rack $C^1$ is raised periodically into gear with the toothed wheel $C$ on the shaft carrying which are two toothed pinions $A^4$ and $A^5$, which gear with toothed rings $A^2$ and $A^3$ (see Fig. 3) mounted on the opposite ends of the cylinder $A$. The rack $C^1$ is raised by a lever $C^7$, which is pivoted to the machine frame at $c$ and one end of this lever enters an opening $C^4$ in the vertical arm of the T-shaped bar $C^2$, whilst the other end is furnished with an eccentrically mounted roller which projects into the groove in the face-cam $D$ (see Fig. 1). The cam $D$ thus raises and lowers the lever $C^7$ the bar $C^2$ and rack $C^1$ positively. The cam shaft $D$ is furnished with a bevel gear wheel which gears with a bevel gear wheel $D^3$ on a driving shaft.

The mechanism also comprises a holding pawl $E$, carried by one arm $E^1$ of a two-part lever, the other arm $E^2$ of which is furnished with an eccentrically mounted roller $E^5$ which enters the cam path of the face-cam $D$ which raises the rack $C^1$ into engagement with the toothed wheel C. The two parts of this lever turn on a common pivot $E^3$, which also clamps them together and the arms $E^1$, $E^2$, are coupled together by a pin $E^4$. The pivot pin $E^3$ passes through vertical slots in the arms $E^1$, $E^2$, and when partially released, the pawl E falls by gravity away from the wheel C. As the rack $C^1$ will also be disengaged from the wheel C, the casing B, $B^1$, can easily be removed from or placed on the composing machine.

The cam D is so contrived that it will move the rack $C^1$ fully into engagement with the toothed wheel C, before the holding pawl E is disengaged therefrom by the cam and vice versa.

At the end of each line of composition, the cam F will move the bar $C^5$ to the right as shown in the drawings, and as the cam D will have raised the rack $C^1$ into gear with the wheel C, the sheet-support A will be rotated through the toothed wheels $A^2$, $A^3$, $A^4$, $A^5$ and C to present a fresh portion of the sheet, in accurate position, to receive a fresh line of composition, the extent of this rotational movement being determined by the preliminary setting of the bar $C^5$ relatively to the scale $C^{10}$.

The driving gearing between the measuring rack $C^1$ and the sheet-supporting cylinder A is a reduction gearing and the reduction may be varied to suit requirements: in the example herein illustrated the ratio of reduction is 14 to 1.

It is necessary to position or re-position the sheet-support A absolutely accurately with reference to an opening $B^4$ in the casing B, $B^1$, through which the photographic rays are admitted and that the same degree of accuracy be given to the step-by-step movement of the support A for line-by-line feeding. These settings and movements are transmitted through the gearing $A^2$, $A^3$, $A^4$, $A^5$, C and $C^1$ and the necessary manipulations are facilitated and a very high degree of accuracy is ensured by a scale G fixed to the shaft $A^1$ of the sheet-support A movable relatively to a fixed index pointer $G^1$ on the end of the casing B, $B^1$, and by a finer or vernier scale $G^2$ fixed to the shaft of the toothed wheel C and co-operating with an index finger $G^3$.

When the cam F in turning, releases the bar $C^5$, the latter is returned to initial position against the face of the cam by the spring $C^{12}$ (see Figs. 1 and 5), one end of which is coupled to a lug on the bar $C^5$ and the other is anchored to the machine frame. When text is being composed, the amount of rotary movement given to the sheet-support A will be that of the point size of the characters being composed together with an amount, which may be varied, representing the amount of interlinear space. When other matter, for example a pattern or background comprising a number of different elements, is being composed then the amount of rotary movement given to the support A from the cam E will be the point size of the elements, so that the matter in each line of composition will join up with the matter of the adjacent lines to form an unbroken or continuous pattern lengthwise on the receiving sheet.

In the base of the casing B, $B^1$, there is provided an opening $B^4$, through which pass the light-rays embracing the image to be photographed. As already stated, the sheet-support A remains stationary throughout the composition of a line of typographic matter and the successive images are projected singly and each in accurate position as regards register and alignment, by any known means, for example a prism or reflector, which forms part of an optical system and which is moved step-by-step along the opening $B^4$. Such means of projection form no part of the present invention.

The casing is provided with handles $B^9$ to facilitate the positioning of the carrier A and the casing B, $B^1$ on the removal thereof from the composing machine. The casing B, $B^1$, together with the support carrier A, can be removed from the composing machine for the purpose of the insertion or removal of a sensitized sheet in a dark room, and to enable this to be done easily and quickly, the casing is secured to the frame of the machine by two bolts $B^5$, $B^6$, which are hinged to the machine frame and are shouldered to bear upon slotted lugs $B^7$, $B^8$ on the part $B^1$ of the casing.

In order to prevent the entry of light through the opening $B^4$ when the casing is removed from the machine, a pad $A^7$ of rubber, or other appropriate material, is fixed to the support A to extend over the opening $B^4$.

The accurate positioning of the casing B, $B^1$, with the sheet-support A on the composing machine and more particularly with the opening $B^4$ therein through which the photographic-rays enter, is determined by positioning studs $B^{10}$ arranged to enter holes $X^1$ in the machine frame X. These holes $X^1$ are slightly enlarged at the upper ends to facilitate the entry therein of the studs $B^{10}$ and the casing is finally positioned with extreme accuracy by dowels $B^{11}$ on the lower side of the casing $B^1$ which are arranged to fit tightly in corresponding sockets $X^2$ in the machine frame.

A sensitized sheet is placed on the cylinder A with its top edge against a straight edge $A^8$ (see Fig. 4) and its right-hand edge against a rim or flange $A^9$ (see Fig. 3) which acts as a side gauge or lay. The sheet is thus held taut and in entire physical contact with the cylinder A as a solid backing and the sheet can thus be temporarily secured in an exactly registered position by means of adhesive tape arranged conveniently at the margins of the sheet.

The casing B, $B^1$ with the support and sheet mounted thereon, can then be placed on the composing machine, the light-ray opening in the casing being closed by the pad $A^7$.

The casing B, $B^1$ will be placed on the composing machine when the feeding rack $C^1$ is out of engagement with the wheel C and the holding-pawl E, by releasing the screw $E^3$, will also be freed from the wheel C.

Figure 4:
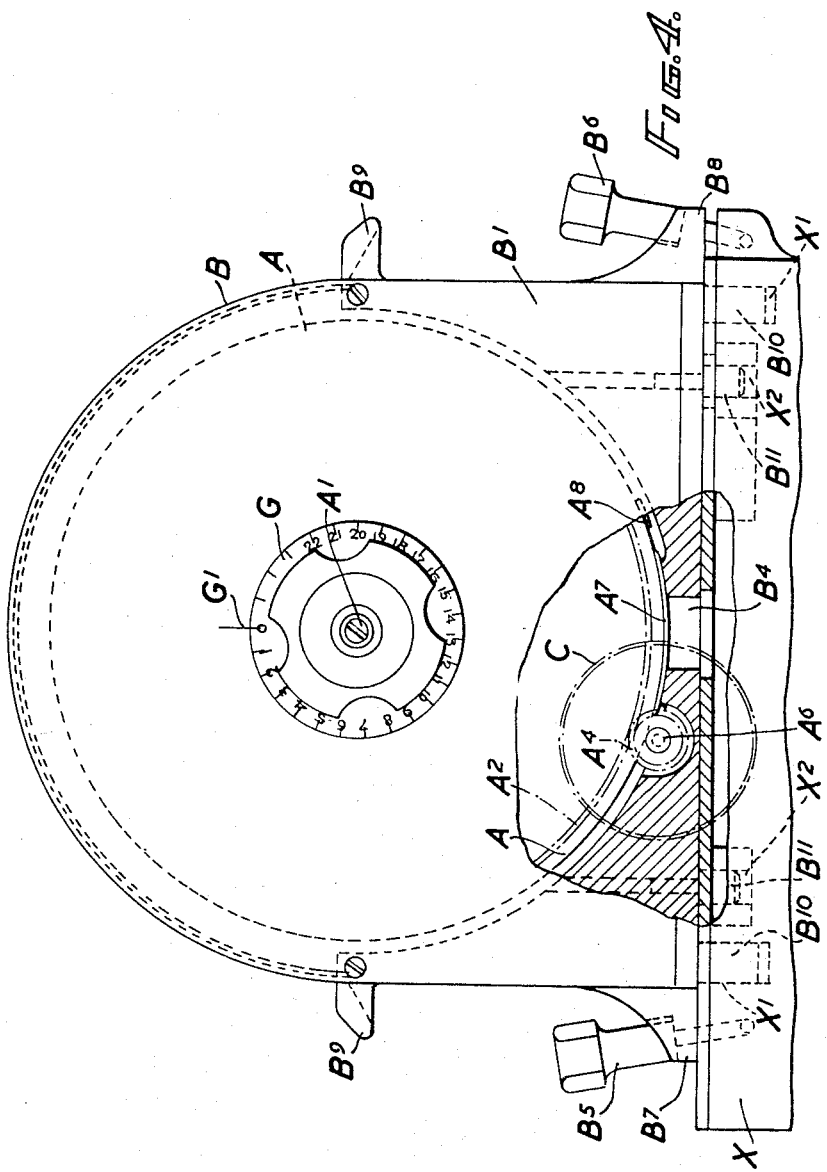
Fig. 4 is a front elevation, partly in section, showing an assembly of the feed-control, the mechanism and certain scales cooperating with devices and looking in the direction of the arrows shown on Fig. 3, the driving mechanism

When a sensitized sheet has been placed on the cylinder A and the latter arranged within the casing B, $B^1$, the opening $B^4$ will be closed by the pad or shutter $B^7$ and the end gauge $A^8$ for the sensitized sheet will be approximately positioned as shown in Fig. 4.

When the casing has been placed on the composing machine, the knob $E^3$ is turned to release the pawl E from the wheel C, then by turning the gauge G relatively to the pointer $G^1$ the support A can be turned to bring the leading end of the sensitized sheet on the support A to proper position relatively to the opening $B^4$ to receive the matter for the first line of composition.

By ensuring through the devices above described, the very accurate positioning of the casing B, $B^1$ with sheet-support A on a composing machine, more than one casing can be employed and composition can be continued on a second sensitized sheet whilst the first one is being processed.

Likewise, by supporting the sensitized sheet taut against a solid backing between which and the sheet there is no accidental or incidental relative movement, there is no likelihood of irregular feeding, as may occur when a sensitized roll-film is fed from a delivery roller on to a take-up roller and is furnished with a loose opaque paper backing. Furthermore, when roll films are employed in these machines, clamps have to be employed to press the portion of the film at the photographing point against an anvil or a table and such clamping has a tendency and a danger to displace or contort the film locally and such temporary disturbance prevents the faithful reproduction of all the essential characteristics of fine type-faces, particularly serifs and hair-lines.

The precision with which the film support A can be adjusted at each step in its movement through the composing machine and the accurate resetting of the support A by the mechanism of the present invention, enables text-matter or letter-press, to be photographed on the sheet after the main body of the composition has been completed. Examples of such extraneous matter are: Chapter headings and numbers, captions, two-line characters, and other printable symbols and devices.

It has been a practice hitherto to photograph such extraneous matter separately, and insert it in the main film after the latter has been developed. Such methods are costly and laborious and require the services of highly-skilled operators. Difficulties also arise in the use of roll-films if extraneous matter is to be photographed on the original film. Re-positioning the film for such purposes tends to give rise to abrasion of the sensitized surface during rewinding and the uncertainty of the clamping devices holding the desired portion of the film having the same effect on the film each time.

The precision with which the sheet-supporting cylinder can be set by the mechanism of the present invention, relatively to the opening $B^4$ in the casing for the passage of the photographic rays facilitates the composition of column matter since, after the photo-composition of the matter for one column, the sheet-support A can be reset for the composition of one or more additional columns alongside the first column and the perfect alignment of the matter of one column with the other column or columns can be assured.

The ratio of possible adjustment of the film support A, provided by the mechanism C, $C^1$, $C^5$, $A^8$, $A^5$, $A^2$ and $A^3$ and the scales on the casing B, $B^1$, and on the shaft of the wheel C, enable adjustments of the carrier A to be made and observed to within .0003″, and permit of special or extraneous images to be photographed on to the sheet film in absolute accuracy with the main composition.

What I claim is:

1. A mechanism for feeding sensitized sheet in a photo-composing machine comprising in combination, a rigid cylindrical support furnished with registering devices for the sheet and rotatably mounted on a shaft within a light-excluding casing furnished with a transverse opening for the admission of photographic rays, a ratio-reducing driving gear for the support, and adjustable measuring and gauging bar furnished with a rack, a rotating cam for operating the measuring bar to impart periodically step-by-step movements to the support, a holding pawl for the cylindrical support, a rotating cam for raising the measuring bar to engage the rack thereon, and a rotating cam for engagement and disengaging the measuring bar and holding pawl with the driving gear alternately.

2. A mechanism for feeding a sensitized sheet, line-by-line in a photo-composing machine, comprising in combination a rigid cylindrical support furnished with registering devices for the sensitized sheet and rotatably mounted in a light-excluding casing furnished with a transverse opening for the admission of photographic rays, gear wheels on the ends of the cylindrical support, a driving gear for rotating the cylindrical support, mechanism for engaging, periodically the driving gear with the gear wheel in the support, an adjustable measuring scale bar for determining the extent of step-by-step rotary movements of the cylindrical support, a hand operated adjustable stop for the scale bar, mechanically operated mechanism for periodically engaging the scale bar with the driving gear, and the mechanism for driving the scale bar when engaged with the driving gear to impart step-by-step movements to the sheet support in accordance with the setting of the scale bar.

3. A mechanism for feeding sensitized sheet line-by-line in a photo-composing machine comprising in combination, a rigid cylindrical support furnished with registering devices for the sheet and rotatably mounted on a shaft within a light-excluding casing furnished with a transverse opening for the admission of photographic rays, gear wheels on the cylindrical support, a ratio-reducing driving gear for the support, mechanism operated periodically to engage the driving gear with the gear wheels on the cylindrical support, an adjustable scale bar furnished with a rack, a hand operated adjustable stop for the scale bar, a holding pawl for the cylindrical support, a rotating cam for raising the scale bar to engage the rack thereon with the driving gear, a periodically rotated cam for moving the scale bar a distance determined by the adjustable stop and a rotating cam for engaging and disengaging the scale bar and the holding pawl with the driving gear alternatively.

4. A mechanism for feeding a sensitized sheet line-by-line in a photo-composing machine comprising in combination, a rigid cylindrical support furnished with registering devices for the sheet and rotatably mounted on a shaft within a light-excluding casing, gear wheels on the ends of the cylindrical support, a ratio-reducing driving gear for the support, mechanism operated periodically to engage the driving gear with the wheels on the cylindrical support, a longitudinally adjustable measuring bar furnished with a rack, a holding pawl for the support, a cam for alternately engaging the rack and the holding pawl with the driving gear, a rotating cam for imparting longitudinally movement to the scale bar when engaged with the driving gear and determine the extent of a step-by-step rotary movement of the support, a manually rotatable micrometer gauge on the shaft of the support, and a manually adjustable micrometer gauge on a shaft of the ratio-reducing gear.

References Cited in the file of this patent

UNITED STATES PATENTS

| Number | Name | Date |
|---|---|---|
| 582,157 | Eaton | May 4, 1897 |
| 1,107,520 | Holst | Aug. 18, 1914 |
| 1,975,439 | Uher | Oct. 2, 1934 |
| 2,075,201 | Jones | Mar. 30, 1937 |
| 2,077,490 | Paris | Apr. 20, 1937 |
| 2,313,119 | Brand | Mar. 9, 1943 |
| 2,555,631 | Bumstead | June 5, 1951 |